(12) United States Patent
Kim (10) Patent No.: US 12,187,191 B2
(45) Date of Patent: Jan. 7, 2025

(54) VEHICULAR ACTIVE SPOILER-TYPE LIGHTING DEVICE AND METHOD

(71) Applicant: HYUNDAI MOBIS CO., LTD., Seoul (KR)

(72) Inventor: Do Hyung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/219,852

(22) Filed: Jul. 10, 2023

(65) Prior Publication Data
US 2024/0017665 A1     Jan. 18, 2024

(30) Foreign Application Priority Data
Jul. 12, 2022   (KR) .................. 10-2022-0085962

(51) Int. Cl.
| | | |
|---|---|---|
| B62D 35/00 | (2006.01) | |
| B60Q 1/00 | (2006.01) | |
| B60Q 1/26 | (2006.01) | |
| B60Q 1/44 | (2006.01) | |

(52) U.S. Cl.
CPC ......... B60Q 1/2692 (2013.01); B60Q 1/0035 (2013.01); B60Q 1/0076 (2013.01); B60Q 1/44 (2013.01); B62D 35/007 (2013.01)

(58) Field of Classification Search
CPC .... B62D 35/007; B62D 35/005; B62D 37/02; B62D 37/00; B60Q 1/44; B60Q 1/0076; B60Q 1/0035; B60Q 1/2629; B60Q 1/05; B60Q 1/2661
See application file for complete search history.

(56) References Cited

U.S. PATENT DOCUMENTS

| | | | |
|---|---|---|---|
| 10,457,122 B2 * | 10/2019 | Cunningham ....... | B62D 35/008 |
| 11,458,885 B2 * | 10/2022 | Cha ................... | B60Q 1/2661 |
| 2018/0051859 A1 * | 2/2018 | Scervo ................ | B60K 13/02 |
| 2022/0242496 A1 | 8/2022 | McAfee et al. | |

FOREIGN PATENT DOCUMENTS

| | | |
|---|---|---|
| DE | 10 2005 055 702 A1 | 5/2007 |
| DE | 10 2016 206 531 A1 | 11/2016 |
| DE | 10 2022 100 006 A1 | 11/2022 |

(Continued)

OTHER PUBLICATIONS

Innovation q+ npl search (Year: 2023).*
Office Action issued Mar. 7, 2024 for German Patent Application No. 10 2023 117 724.9.

*Primary Examiner* — Anabel Ton
(74) *Attorney, Agent, or Firm* — Morgan, Lewis & Bockius LLP (57) ABSTRACT

A vehicular active spoiler-type lighting device and a vehicular active spoiler-type lighting method includes an insertion recess formed in a vehicle body, an air current adjustment module inserted into the insertion recess and protruding out of the insertion recess, thereby changing a direction of air current flowing along a surface of the vehicle body, a drive module mounted in the insertion recess, connected to the air current adjustment module, and configured to insert the air current adjustment module into the insertion recess or to pull the air current adjustment module out of the insertion recess, and a lamp module configured to provide lighting to the air current adjustment module.

18 Claims, 5 Drawing Sheets

(56) References Cited

FOREIGN PATENT DOCUMENTS

| | | |
|---|---|---|
| EP | 3741620 A1 | 11/2020 |
| FR | 2854861 A1 | 11/2004 |
| FR | 2896759 A1 | 8/2007 |
| JP | 2010-143522 A | 7/2010 |
| KR | 10-2011-0049295 A | 5/2011 |
| KR | 10-1581007 B1 | 12/2015 |
| WO | 2018/100271 A1 | 6/2018 |

\* cited by examiner

VEHICULAR ACTIVE SPOILER-TYPE LIGHTING DEVICE AND METHOD

CROSS-REFERENCE TO RELATED APPLICATION

This application claims priority from and the benefit of Korean Patent Application No. 10-2022-0085962, filed on Jul. 12, 2022, which is hereby incorporated by reference for all purposes as if set forth herein.

BACKGROUND

Field

Exemplary embodiments of the present disclosure relate to a vehicular active spoiler-type lighting device and a vehicular active spoiler-type lighting method and, more particularly, to a vehicular active spoiler-type lighting device and a vehicular active spoiler-type lighting method which are capable of providing lighting to a vehicle and in which an air current adjustment module protrudes to the outside according to need in order to improve vehicle traveling performance.

Discussion of the Background

Usually, various lamps are used in a vehicle in order for a driver to effectively send a signal associated with his/her vehicle's traveling to other vehicles. Among these lamps, a rear lamp into which a direction indicating light, a brake light, a rear light, and a backup light are configured to be structurally combined is mounted on the rear of the vehicle.

A spoiler is mounted within a vehicle body in order to reduce aerodynamic resistance while the vehicle travels at a high speed. However, designing the spoiler to be mounted within the vehicle body is challenging due to interference of the spoiler with the rear lamp. Accordingly, there is a need to improve the design of the spoiler.

The related art of the present disclosure is disclosed in Korean Patent Application Publication No. 10-2011-0049295 (published on May 12, 2011 and entitled "Rear Combination Lamp and Lighting System Using the Same").

SUMMARY

Exemplary embodiments of the present disclosure, which is contrived to solve the above-mentioned problem, are directed to a vehicular active spoiler-type lighting device and a vehicular active spoiler-type lighting method which are capable of providing lighting to a vehicle and in which an air current adjustment module protrudes to the outside according to need in order to improve vehicle traveling performance.

In an embodiment, a vehicular active spoiler-type lighting device includes: an insertion recess formed in a vehicle body; an air current adjustment module inserted into the insertion recess and protruding out of the insertion recess, thereby possibly changing a direction of air current flowing along a surface of the vehicle body; a drive module mounted in the insertion recess, connected to the air current adjustment module, and configured to insert the air current adjustment module into the insertion recess or to pull the air current adjustment module out of the insertion recess; and a lamp module configured to provide lighting to the air current adjustment module.

In an embodiment, in the vehicular active spoiler-type lighting device, the insertion recess may have a shape formed by recessing the surface of the vehicle body.

In an embodiment, in the vehicular active spoiler-type lighting device, the air current adjustment module may correspond in shape to the insertion recess, and thus may block the insertion recess from being exposed to the outside.

In an embodiment, in the vehicular active spoiler-type lighting device, the drive module may be fixed inside the insertion recess and may vary in length.

In an embodiment, in the vehicular active spoiler-type lighting device, the drive module may be movable in a sliding manner inside the insertion recess.

In an embodiment, in the vehicular active spoiler-type lighting device, the air current adjustment module may guide propagation of light generated by the lamp module toward the rear or lateral side of the vehicle body.

In an embodiment, in the vehicular active spoiler-type lighting device, the air current adjustment module may be formed in such a manner as to have a length in the leftward-rightward direction of the vehicle body.

In an embodiment, in the vehicular active spoiler-type lighting device, the air current adjustment modules may be formed in such a manner as to have a length in the upward-downward direction of the vehicle body.

In an embodiment, in the vehicular active spoiler-type lighting device, the air current adjustment modules may be formed in such a manner as to have a length in the leftward-rightward direction and lengths in the upward-downward direction.

In an embodiment, in the vehicular active spoiler-type lighting device, the air current adjustment modules may be connected to each other to be driven at the same time or may be separated from each other to be driven individually.

In an embodiment, in the vehicular active spoiler-type lighting device, the lamp may be turned on in a state where the air current adjustment module protrudes.

In an embodiment, the vehicular active spoiler-type lighting device may further include a sealing member mounted in the insertion recess, brought into close contact with the air current adjustment module, and blocking a foreign material from being introduced.

In an embodiment, the vehicular active spoiler-type lighting device may further include a controller configured to operate one of the drive module and the lamp module.

In an embodiment, a vehicular active spoiler-type lighting method includes: inputting an instruction to operate a drive module mounted in an insertion recess; detecting whether or not a lamp module providing lighting to an air current adjustment module connected to the drive module is turned on; and moving the air current adjustment module in such a manner as to protrude out of the insertion recess, by driving the drive module in a state where the lamp module is turned off.

In an embodiment, in a vehicular active spoiler-type lighting method, the instruction to operate the drive module may be input when switching from a traveling mode to a sports mode takes place.

In an embodiment, in the vehicular active spoiler-type lighting method, a processor for autonomous traveling may input the instruction to operate the drive module in order to communicate with a pedestrian or another vehicle.

In an embodiment, the vehicular active spoiler-type lighting method may further include: detecting whether or not a vehicle comes to a stop, when the lamp module is in a turned-on state; and moving the air current adjustment module in such a manner as to protrude out of the insertion recess, by driving the drive module when the vehicle is in a stopped state.

In an embodiment, the vehicular active spoiler-type lighting method may further include alerting that the drive module is not operable, when the vehicle is in a traveling state.

In an embodiment, in the vehicular active spoiler-type lighting method, the lamp module may detect a timer setting or illuminance and thus may be turned on or turned off.

In an embodiment, in the vehicular active spoiler-type lighting method, the lamp module may be turned on or turned off by operation of a switch by a driver.

In the vehicular active spoiler-type lighting device and the vehicular active spoiler-type lighting device according to the present disclosure, the air current adjustment module is inserted into the insertion recess formed in the vehicle body, and the light generated by the lamp module mounted on the air current adjustment module passes through the air current adjustment module, resulting in line lighting being provided. According to need, the air current adjustment module protrudes out of the insertion recess by the drive module. Thus, aerodynamic resistance can be reduced.

DETAILED DESCRIPTION OF THE ILLUSTRATED EMBODIMENTS

A vehicular active spoiler-type lighting device and a vehicular active spoiler-type lighting method according to first and second embodiments, respectively, of the present disclosure will be described below with reference to the accompanying drawings. For clarity and convenience in description, thicknesses of lines, sizes of constituent elements, and the like may be illustrated in non-exact proportion in the drawings. In addition, a term to be assigned to a constituent element according to the present disclosure is defined considering a function of the constituent element and may vary according to a user's intention or a manager's intention or based on practices in the art. Therefore, the term should be defined in context in light of the present specification.

Figure 1:
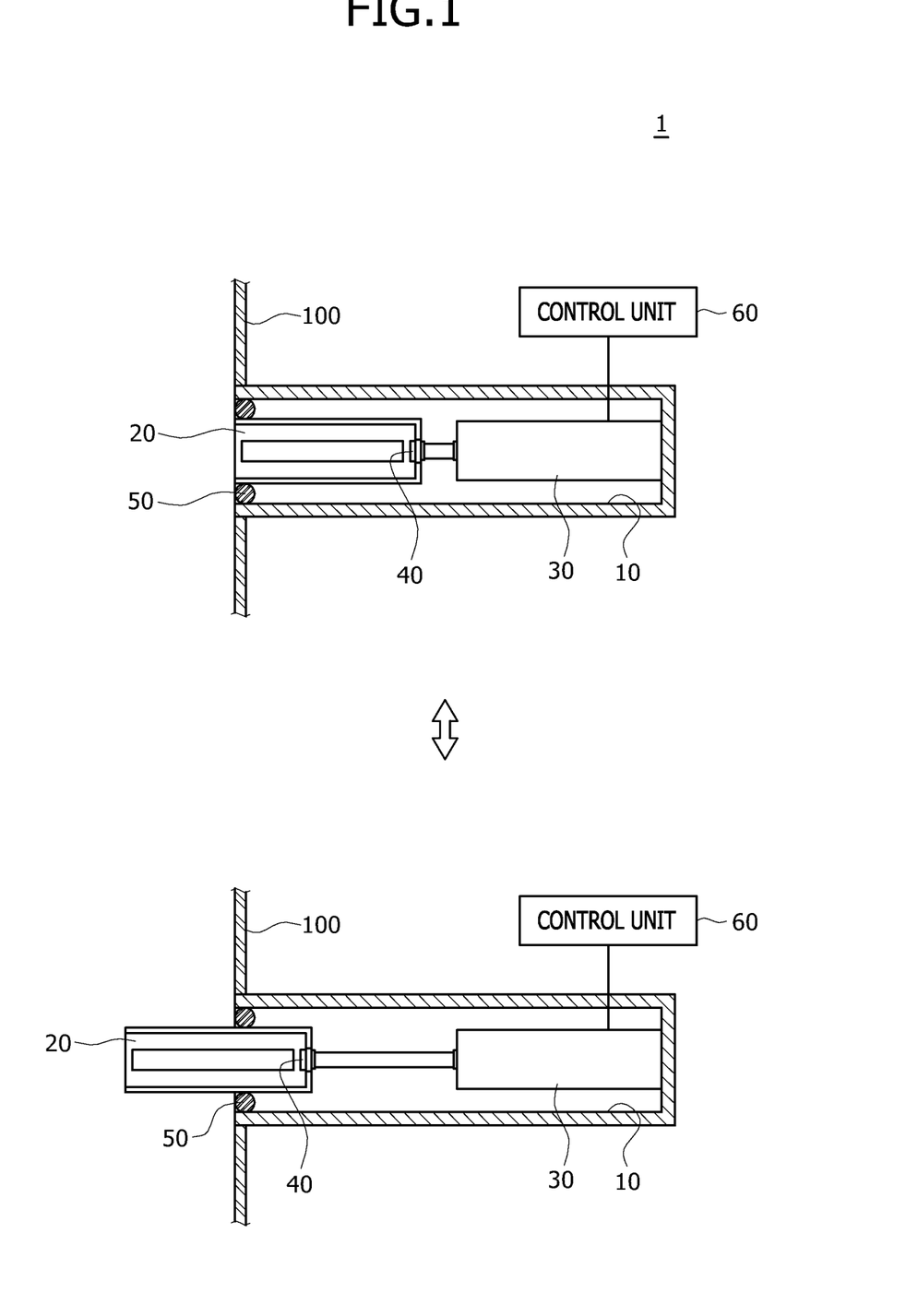
FIG. 1 is a view schematically illustrating a vehicular active spoiler-type lighting device according to a first embodiment of the present disclosure.

FIG. 1 is a view schematically illustrating the vehicular active spoiler-type lighting device 1 according to the first embodiment of the present disclosure. With reference to FIG. 1, the vehicular active spoiler-type lighting device 1 according to the first embodiment of the present disclosure includes an insertion recess 10, an air current adjustment module 20, a drive module 30, and a lamp module 40.

The insertion recess 10 may be formed in a vehicle body 100. The insertion recess 10 may have a shape that is formed by recessing the vehicle body 100. Thus, the insertion recess 10 may be exposed to the outside and may provide an installation space. The insertion recess 10 may form a line in order to realize a line of light.

The air current adjustment module 20 may be inserted into the insertion recess 10. The air current adjustment module 20 may protrude out of the insertion recess 10 according to need, thereby changing a direction of air current flowing along a surface of the vehicle body 100. The air current adjustment module 20 may be designed in a manner that corresponds in shape to the insertion recess 10 and thus may block the insertion recess 10 from being exposed to the outside.

The drive module 30 may be mounted in the insertion recess and may be connected to the air current adjustment module 20. The air current adjustment module 20 may be inserted into or pulled out of the insertion recess 10 by the drive module 30. The drive module 30 may be built into the insertion recess 10 and may be coupled to the air current adjustment module 20. The drive module when electric power is applied thereto, may vary in length or may be moved in a sliding manner, thereby changing a position of the air current adjustment module 20.

The lamp module 40 may provide lighting to the air current adjustment module 20. The lamp module 40 may be mounted on the air current adjustment module 20 and may emit light. Light that is supplied by the lamp module 40 may pass through the air current adjustment module 20, resulting in lighting being provided. A plurality of lamp modules 40 may be spaced apart in the lengthwise direction of the air current adjustment module 20 and may emit light. In addition, an optical guide may be formed on the air current adjustment module 20 in the lengthwise direction thereof, and one lamp module 40 may emit light to the optical guide.

The air current adjustment module 20 may be mounted on the drive module 30 and may transmit light generated by the lamp module 40. The air current adjustment module 20 may guide straight-line propagation of the light generated by the lamp module 40 and may guide propagation of the light toward the rear or lateral side of a vehicle. The lamp module 40 may provide red light or white light. A separate complementary color lens may be arranged on the air current adjustment module 20 and may change a light color. The air current adjustment module 20 may include an inner lens part and an outer lens part that is formed in such a manner as to surround the inner lens part and thus protects the inner lens part. The inner lens part may expand the light generated by the lamp module 40, and the light passing through the inner lens part may pass through the outer lens part, resulting in lighting being provided to the outside.

According to the present disclosure, the air current adjustment module 20 may be mounted on the drive module 30 and may be possibly variously design-changed to transmit the light generated by the lamp module 40 toward the outside. The air current adjustment module 20 is schematically illustrated in the drawings in such a manner that a fundamental function thereof is understandable. The air current adjustment module 20 is briefly described under the legend "Detailed Description of the Illustrated Embodiments."

The vehicular active spoiler-type lighting device 1 according to the first embodiment of the present disclosure may further include a sealing member 50. The sealing member 50 may be mounted in the insertion recess 10 and may be brought into close contact with the air current adjustment module 20. The sealing member 50 may be manufactured of a material containing an elastic component and may fill in a gap between the insertion recess 10 and the air current adjustment module 20. Thus, the sealing member 50 may prevent irregular movement of the air current adjustment module 20 due to introduction of a foreign material and may block formation of a turbulent flow due to air introduction.

The vehicular active spoiler-type lighting device 1 according to the first embodiment may further include a controller 60. The controller 60 may operate at least one of the drive module 30 and the lamp module 40. The controller 60 may selectively operate each of the drive module 30 and the lamp module 40 when it receives a signal generated by a driver to operate each of them or when a condition for operating each of them is satisfied. Accordingly, only the air current adjustment module 20 may protrude, or the lamp module 40 may be turned on in a state where the air current adjustment module 20 protrudes, thereby complying with traffic regulations.

Figure 2:
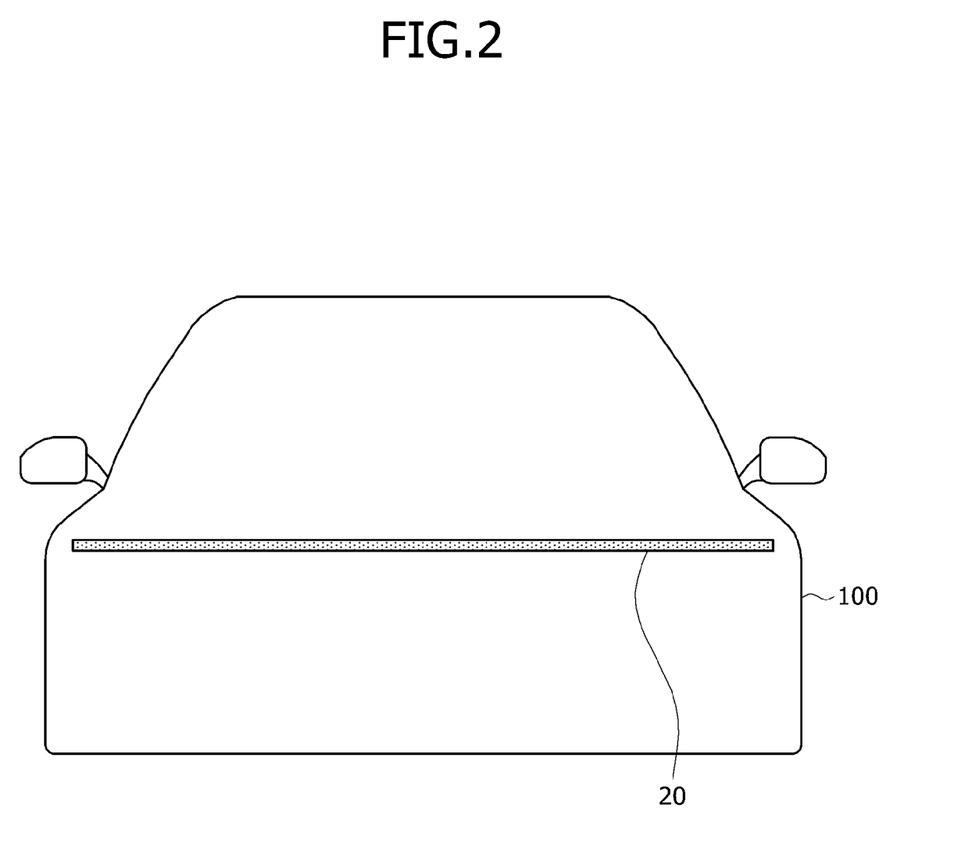
FIG. 2 is a view schematically illustrating a state where an air current adjustment module according to the first embodiment of the present disclosure is installed in such a manner as to have a length in the leftward-rightward direction.

FIG. 2 is a view schematically illustrating a state where the air current adjustment module according to the first embodiment of the present disclosure is installed in such a manner as to have a length in the leftward-rightward direction. With reference to FIG. 2, the air current adjustment module 20 may be formed in such a manner as to have a length in the leftward-rightward direction of the vehicle body 100. The air current adjustment module 20 may be inserted into the insertion recess 10 formed along the length in the leftward-rightward direction of a trunk door, and the air current adjustment module 20 may be exposed to the outside. When the lamp module 40 is turned on in this state, line lighting may be provided through the air current adjustment module 20. Depending on whether the drive module 30 is driven, the air current adjustment module 20 may be arranged in the same line with the vehicle body 100 or may protrude from the vehicle body 100, thereby reducing aerodynamic resistance.

Figure 3:
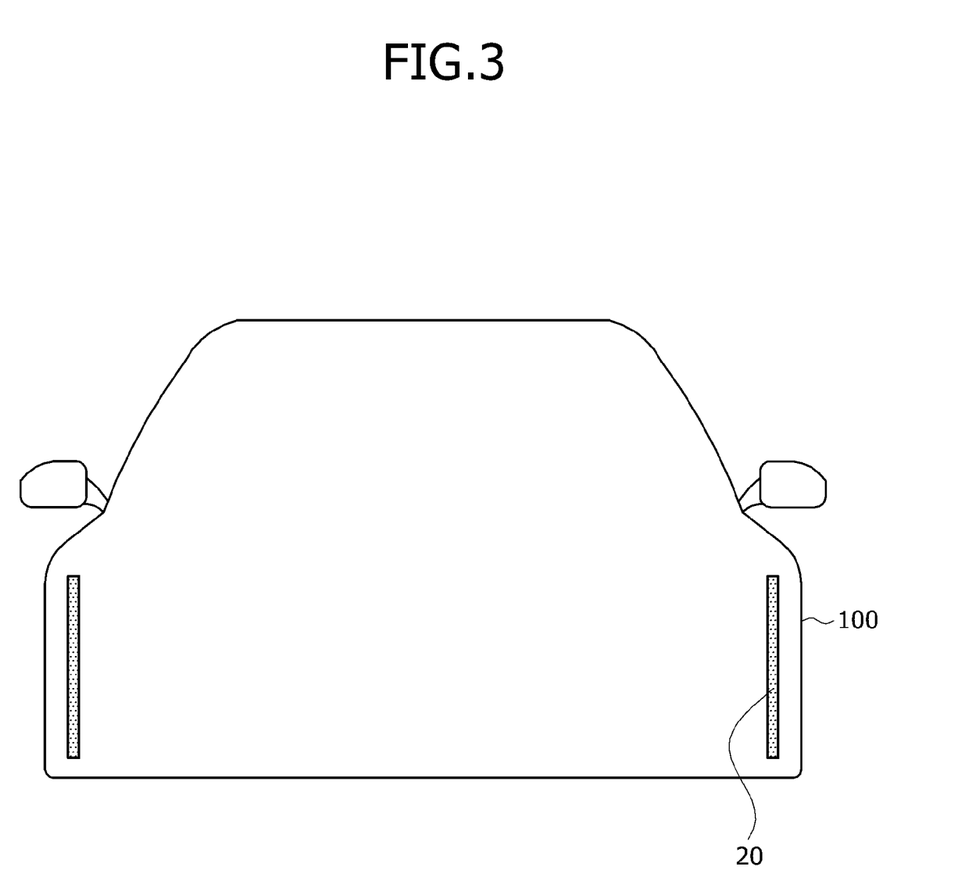
FIG. 3 is a view schematically illustrating a state where the air current adjustment modules according to the first embodiment of the present disclosures are installed in such a manner as to have a length in the upward-downward direction.

FIG. 3 is a view schematically illustrating a state where the air current adjustment modules according to the first embodiment of the present disclosures are installed in such a manner as to have a length in the upward-downward direction. With reference to FIG. 3, the air current adjustment modules 20 may be formed in such a manner as to have a length in the upward-downward direction of the vehicle body 100. The air current adjustment modules 20 may be inserted into one pair of the insertion recesses 10 that are formed in left and right sides, respectively, of the rear of the vehicle, along the length in the upward-downward direction of the rear of the vehicle, and may be exposed to the outside. When the lamp module 40 is turned on in this state, the line lighting may be provided through the air current adjustment modules 20. Depending on whether the drive module 30 is driven, the air current adjustment module 20 may be arranged in the same line with the vehicle body 100 or may protrude from the vehicle body 100, thereby reducing the aerodynamic resistance.

Figure 4:
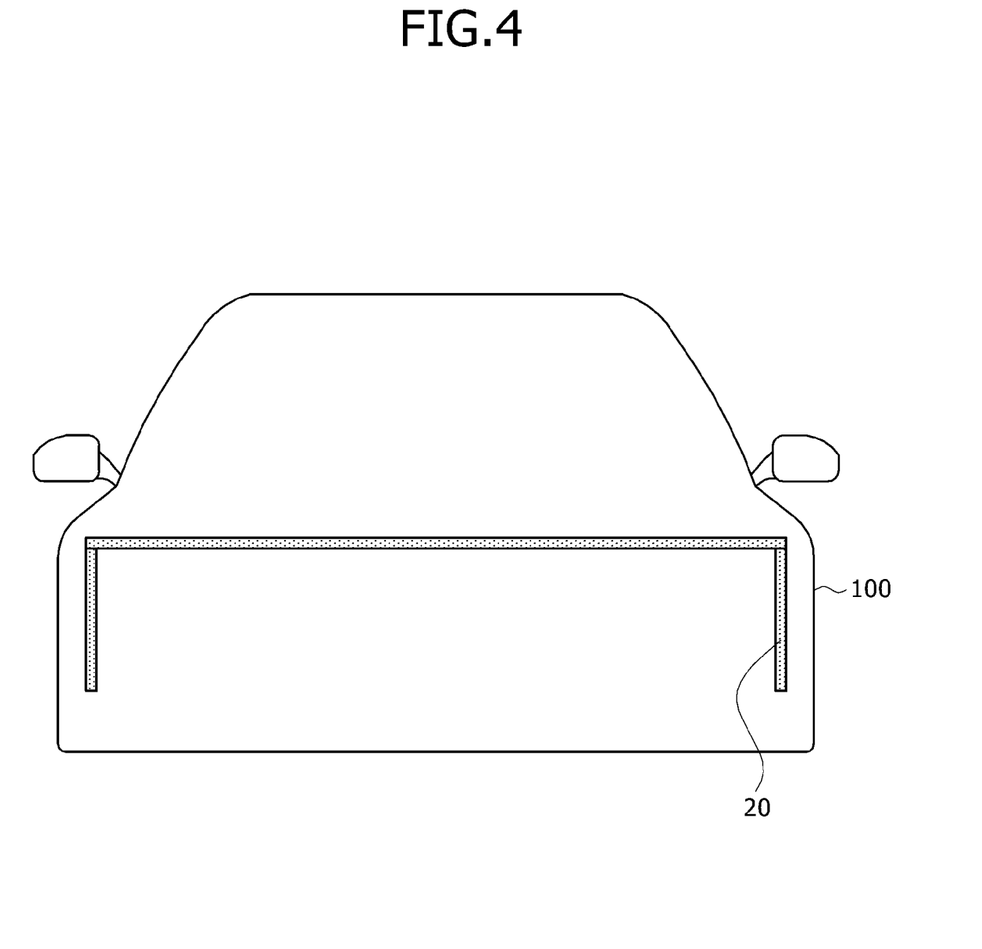
FIG. 4 is a view schematically illustrating a state where the air current adjustment modules according to the first embodiment of the present disclosure are installed in such a manner as to have a length in the leftward-rightward direction and lengths in the upward-downward direction.

FIG. 4 is a view schematically illustrating a state where the air current adjustment modules according to the first embodiment of the present disclosure are installed in such a manner as to have a length in the leftward-rightward direction and lengths in the upward-downward direction. With reference to FIG. 4, the air current adjustment modules 20 are formed in such a manner as to have a length in the leftward-rightward direction of the vehicle body 100 and lengths in the upward-downward direction of the vehicle body 100. The shapes of the air current adjustment modules 20 in FIG. 4 can be understood by referring to FIGS. 2 and 3. Thus, a detailed description of the air current adjustment modules 20 in FIG. 4 is omitted. The air current adjustment module 20 that has a length in the leftward-rightward direction and the air current adjustment modules 20 that have a length in the upward-downward direction may be connected to each other to protrude at the same time or may be separated from each other to protrude individually.

Figure 5:
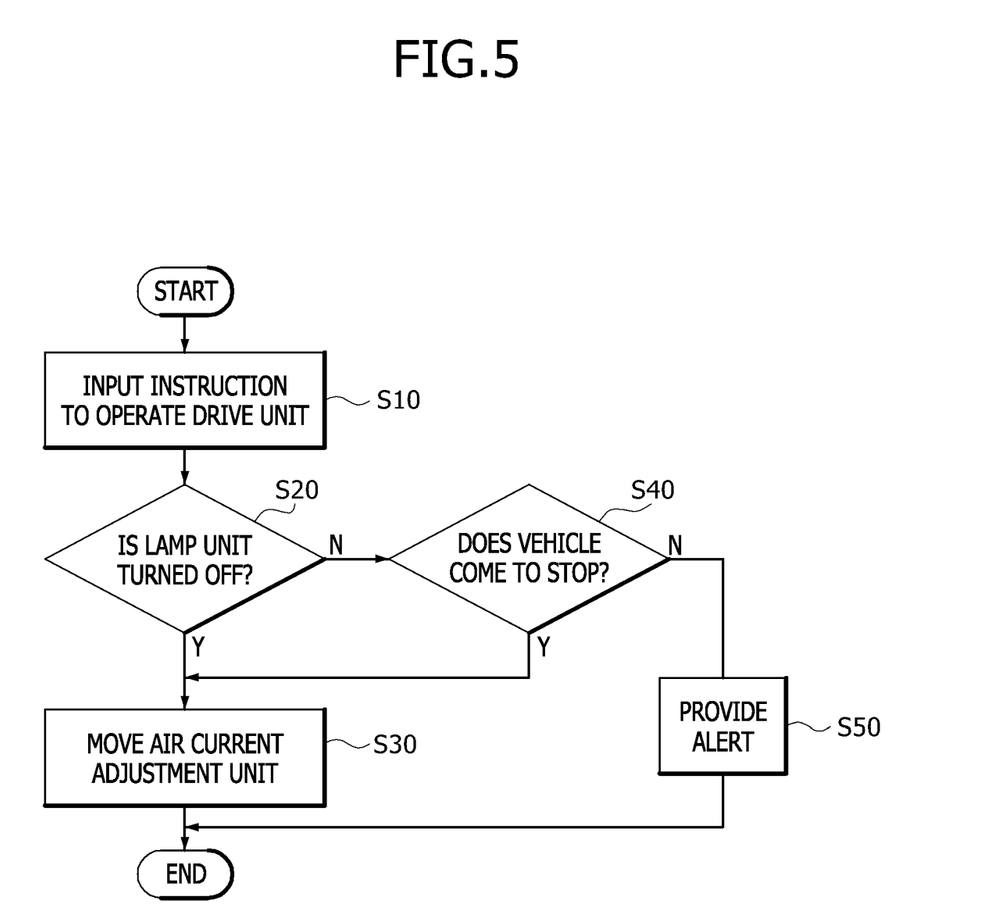
FIG. 5 is a flowchart schematically illustrating a vehicular active spoiler-type lighting method according to a second embodiment of the present disclosure.

FIG. 5 is a flowchart schematically illustrating the vehicular active spoiler-type lighting method according to the second embodiment of the present disclosure. The vehicular active spoiler-type lighting method is described below with reference to FIG. 5.

An instruction to operate the drive module 30 is input in a state where a vehicle engine starts (S10). The drive module 30 is mounted in the insertion recess 10 formed by recessing the vehicle body 100. The insertion recess 10 is inserted into the air current adjustment module 20 and thus is connected to the drive module 30, and the lamp module 40 is mounted on the air current adjustment module 20. In this state, lighting is provided through the air current adjustment module 20.

At this point, when the driver operates a switch for operating the drive module 30 or switches from a traveling mode to a sports mode, the instruction to operate the drive module 30 may be regarded as being input. In addition, a processor for autonomous traveling may input the instruction to operate the drive module 30 in order to communicate with a pedestrian or another vehicle.

When the instruction to operate the drive module 30 is input, the controller 60 detects whether or not the lamp module 40 is turned off (S20).

When the lamp module 40 is in a turned-off state, the controller 60 drives the drive module 30. When the drive module 30 is driven, the air current adjustment module 20 is moved in such a manner as to protrude out of the insertion recess 10 (S30). The air current adjustment module 20 may protrude from the surface of the vehicle body 100, thereby reducing the aerodynamic resistance.

However, when the lamp module 40 is in a turned-on state, the controller 60 detects whether or not the vehicle comes to a stop (S40).

When the vehicle is in a stopped state, the controller 60 drives the drive module 30. When the drive module 30 is driven, the air current adjustment module 20 is moved in such a manner as to protrude out of the insertion recess 10 (S30).

When the vehicle is in a traveling state, the controller 60 alerts the driver that the drive module 30 is not operable (S50). That is, the controller 60 may display on a display a message indicating that the air current adjustment module 20 cannot protrude out of the insertion recess 10 in order to comply with the traffic regulations, or may output such a message in an audio format through a speaker.

The lamp module 40 detects a timer setting or illuminance and thus is turned on or turned off. That is, the lamp module 40 may be turned on only during a user-set time period. In addition, the lamp module 40 may be automatically turned on through an illuminance sensor. In addition, the lamp module 40 may be turned or turned off by operation of a switch by the driver.

In the vehicular active spoiler-type lighting device and the vehicular active spoiler-type lighting device according to the first and second embodiments, respectively, of the present disclosure, the air current adjustment module 20 is inserted into the insertion recess 10 formed in the vehicle body 100, and the light generated by the lamp module 40 mounted on the air current adjustment module 20 passes through the air current adjustment module 20, resulting in the line lighting being provided. According to need, the air current adjustment module 20 may protrude out of the insertion recess 10 by the drive module 30, thereby reducing the aerodynamic resistance.

The embodiments of the present disclosure are described only in an exemplary manner with reference to the drawings. It would be understandable by a person of ordinary skill in the art to which the present disclosure pertains that various modifications may possibly be made to the embodiment and that various equivalents thereof may possibly be implemented. Therefore, the proper technical scope of the present disclosure should be defined by the following claims.

What is claimed is:

1. A vehicular active spoiler-type lighting device comprising:
    an insertion recess disposed in a vehicle body;
    an air current adjustment module inserted into the insertion recess and protruding out of the insertion recess, and configured to change a direction of air current flowing along a surface of the vehicle body;
    a drive module mounted in the insertion recess, connected to the air current adjustment module, and configured to pull the air current adjustment module out of the insertion recess or to insert the air current adjustment module into the insertion recess; and
    a lamp module configured to provide lighting to the air current adjustment module,
    wherein the drive module is fixed inside the insertion recess and varies in length or is movable in a sliding manner inside the insertion recess.

2. The vehicular active spoiler-type lighting device of claim 1, wherein the insertion recess is recessed from the surface of the vehicle body.

3. The vehicular active spoiler-type lighting device of claim 1, wherein the air current adjustment module corresponds in shape to the insertion recess, and is configured to block the insertion recess from being exposed to the outside.

4. The vehicular active spoiler-type lighting device of claim 1, wherein the air current adjustment module guides propagation of light generated by the lamp module toward a rear or lateral side of the vehicle body.

5. The vehicular active spoiler-type lighting device of claim 1, wherein the air current adjustment module extends in a leftward-rightward direction of the vehicle body.

6. The vehicular active spoiler-type lighting device of claim 1, wherein the air current adjustment module includes one or more modules each extending in an upward-downward direction of the vehicle body.

7. The vehicular active spoiler-type lighting device of claim 1, wherein the air current adjustment module includes a plurality of modules including one module extending in a leftward-rightward direction and one or more modules each extending in an upward-downward direction.

8. The vehicular active spoiler-type lighting device of claim 7, wherein the plurality of modules of the air current adjustment module are connected to each other to be driven at the same time or are separated from each other to be driven individually.

9. The vehicular active spoiler-type lighting device of claim 1, wherein the lamp is turned on in a state where the air current adjustment module protrudes.

10. The vehicular active spoiler-type lighting device of claim 1, further comprising:
    a sealing member mounted in the insertion recess and being contact with the air current adjustment module to block a foreign material from being introduced.

11. The vehicular active spoiler-type lighting device of claim 1, further comprising:
    a controller configured to operate one of the drive module and the lamp module.

12. A vehicular active spoiler-type lighting method comprising:
    receiving an instruction to operate a drive module mounted in an insertion recess;
    detecting whether or not a lamp module providing lighting to an air current adjustment module connected to the drive module is turned on; and
    moving the air current adjustment module in such a manner as to protrude out of the insertion recess, by driving the drive module in a state where the lamp module is turned off.

13. The vehicular active spoiler-type lighting method of claim 12, wherein the instruction to operate the drive module is received when switching from a traveling mode to a sports mode takes place.

14. The vehicular active spoiler-type lighting method of claim 12, wherein a processor for autonomous traveling inputs the instruction to operate the drive module in order to communicate with a pedestrian or another vehicle.

15. The vehicular active spoiler-type lighting method of claim 12, further comprising:
    detecting whether or not a vehicle comes to a stop, when the lamp module is in a turned-on state; and
    moving the air current adjustment module in such a manner as to protrude out of the insertion recess, by driving the drive module when the vehicle is in a stopped state.

16. The vehicular active spoiler-type lighting method of claim 15, further comprising:
    alerting that the drive module is not operable, when the vehicle is in a traveling state.

17. The vehicular active spoiler-type lighting method of claim 12, wherein the lamp module detects a timer setting or illuminance and is turned on or turned off based on a detection result.

18. The vehicular active spoiler-type lighting method of claim 12, wherein the lamp module is turned on or turned off by operation of a switch by a driver.

* * * * *